(12) United States Patent
Payzer et al.

(10) Patent No.: US 10,864,448 B2
(45) Date of Patent: Dec. 15, 2020

(54) SHAREABLE VIDEO EXPERIENCE TAILORED TO VIDEO-CONSUMER DEVICE

(71) Applicant: Microsoft Technology Licensing, LLC, Redmond, WA (US)

(72) Inventors: Gershom L. Payzer, Redmond, WA (US); Richard Michael Fox, Berlin (DE); Gregory M. Smith, Seattle, WA (US); Connor Peet, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 192 days.

(21) Appl. No.: 15/868,825

(22) Filed: Jan. 11, 2018

(65) Prior Publication Data

US 2019/0111346 A1 Apr. 18, 2019

Related U.S. Application Data

(60) Provisional application No. 62/572,221, filed on Oct. 13, 2017.

(51) Int. Cl.
*A63F 13/86* (2014.01)
*H04N 21/2187* (2011.01)
(Continued)

(52) U.S. Cl.
CPC .............. *A63F 13/86* (2014.09); *A63F 13/30* (2014.09); *H04N 21/2187* (2013.01);
(Continued)

(58) Field of Classification Search
CPC ...................................... A63F 13/86
See application file for complete search history.

(56) References Cited

U.S. PATENT DOCUMENTS

| 8,112,711 B2 | 2/2012 | Ackley |
| 9,266,017 B1 | 2/2016 | Parker et al. |

(Continued)

FOREIGN PATENT DOCUMENTS

| WO | 9966727 A1 | 12/1999 |
| WO | 2000051259 A1 | 8/2000 |
| WO | 2007075051 A1 | 7/2007 |

OTHER PUBLICATIONS

Statt, Nick, "Microsoft is buying a company that lets viewers control video game live streams", Retrieved from: <<https://www.theverge.com/2016/8/11/12446962/microsoft-beam-live-game-streaming-acquisition>>, Aug. 11, 2016, 3 Pages.

(Continued)

*Primary Examiner* — James S. McClellan
(74) *Attorney, Agent, or Firm* — Alleman Hall Creasman & Tuttle LLP

(57) ABSTRACT

A method for distributing a shareable video experience among plural video-consumer devices includes receiving a data stream defining the shareable video experience and generating first and second shared video experiences. The first experience is configured for video-consumer devices capable of real-time interaction with the shareable video experience; it includes a first video stream conveying visual content of the shareable video experience and a first set of interface controls, the first set of interface controls being useable by video-consumer devices capable of real-time interaction to modify the shareable video experience. The second experience is configured for video-consumer devices incapable of real-time interaction; it includes a second video stream conveying visual content of the shareable video experience and a second set of interface controls that are useable by video-consumer devices incapable of real-time (Continued)

interaction to present supplementary data in connection to the shareable video experience.

19 Claims, 5 Drawing Sheets

(51) Int. Cl.

| | |
|---|---|
| *H04N 21/6587* | (2011.01) |
| *H04N 21/262* | (2011.01) |
| *A63F 13/30* | (2014.01) |
| *H04N 21/44* | (2011.01) |
| *H04N 21/478* | (2011.01) |
| *H04N 21/4788* | (2011.01) |

(52) U.S. Cl.
CPC ....... *H04N 21/26233* (2013.01); *H04N 21/44* (2013.01); *H04N 21/4781* (2013.01); *H04N 21/4788* (2013.01); *H04N 21/6587* (2013.01)

(56) References Cited

U.S. PATENT DOCUMENTS

| | | | | |
|---|---|---|---|---|
| 10,269,048 | B2* | 4/2019 | Stergiou | G06Q 30/0277 |
| 10,328,336 | B1* | 6/2019 | Kondal | A63F 9/183 |
| 2004/0143495 | A1* | 7/2004 | Koenig | G06Q 30/02 705/14.49 |
| 2007/0177606 | A1* | 8/2007 | Jabri | H04L 29/06027 370/395.5 |
| 2008/0119286 | A1 | 5/2008 | Brunstetter et al. | |
| 2011/0122063 | A1* | 5/2011 | Perlman | A63F 13/335 345/161 |
| 2011/0178854 | A1* | 7/2011 | Sofer | G06Q 30/0241 705/14.4 |
| 2012/0087637 | A1 | 4/2012 | Logan et al. | |
| 2013/0162680 | A1* | 6/2013 | Perry | G06T 11/00 345/634 |
| 2014/0018157 | A1 | 1/2014 | Kern et al. | |
| 2014/0031121 | A1 | 1/2014 | Kern et al. | |
| 2015/0119142 | A1 | 4/2015 | Abbott et al. | |
| 2015/0121437 | A1 | 4/2015 | Tan | |
| 2016/0030841 | A1 | 2/2016 | Perlman et al. | |
| 2016/0044226 | A1 | 2/2016 | Williams | |
| 2016/0286244 | A1 | 9/2016 | Chang et al. | |
| 2017/0006322 | A1* | 1/2017 | Dury | H04N 21/254 |
| 2017/0354883 | A1* | 12/2017 | Benedetto | A63F 13/533 |
| 2017/0354892 | A1* | 12/2017 | Benedetto | A63F 13/87 |
| 2017/0354893 | A1* | 12/2017 | Benedetto | A63F 13/88 |

OTHER PUBLICATIONS

"Interactive Reference Documentation", Retrieved from: <<https://dev.mixer.com/reference/interactive/index.html>>, Retrieved on: Nov. 24, 2017, 16 Pages.

"Interactive 2 Protocol Specification", Retrieved from: <<https://dev.mixer.com/reference/interactive/protocol/protocol.pdf>>, Retrieved on: Nov. 24, 2017, pp. 1-49.

"Mixer—Interactive Livestreaming", Retrieved from: <<https://mixer.com/?sandbox=xdks.1>>, Retrieved on: Nov. 24, 2017, 2 Pages.

"Performance—interactive-cpp", Retrieved from: <<https://github.com/mixer/interactive-cpp/wiki/Performance>>, Published on: Aug. 29, 2017, 2 Pages.

"Performance—interactive-unity-plugin", Retrieved from: <<https://github.com/mixer/interactive-unity-plugin/wiki/Performance>>, Aug. 29, 2017, 2 Pages.

"International Search Report and Written Opinion Issued in PCT Application No. PCT/US2018/054494", dated Dec. 12, 2018, 12 pages.

* cited by examiner

US 10,864,448 B2

SHAREABLE VIDEO EXPERIENCE TAILORED TO VIDEO-CONSUMER DEVICE

CROSS REFERENCE TO RELATED APPLICATIONS

This application claims priority to U.S. Provisional Patent Application Ser. No. 62/572,221, filed Oct. 13, 2017, the entirety of which is hereby incorporated by reference herein for all purposes.

BACKGROUND

One of the many achievements of the modern Internet is that it enables users to share experiences despite being separated by great distance. Shared video and gaming experiences are particularly valuable to many Internet users. Multiplayer interactive gaming, for instance, continues to gain in popularity and has even become somewhat of a 'spectator sport'. Moreover, the range of user devices capable of retrieving and displaying video from the internet—including game video—continues to broaden. Nevertheless, not every Internet-connected device offers the same opportunities to interact with others or to receive video in a network environment.

SUMMARY

One aspect of this disclosure is directed to a method for distributing a shareable video experience among plural video-consumer devices. The method comprises receiving from a provider device a data stream defining the shareable video experience and generating first and second shared video experiences based on the data stream. The first shared video experience is configured for video-consumer devices capable of real-time interaction with the shareable video experience; it includes a first video stream conveying visual content of the shareable video experience and a first set of interface controls, the first set of interface controls being useable by video-consumer devices capable of real-time interaction to modify the shareable video experience. The second shared video experience is configured for video-consumer devices incapable of real-time interaction with the shareable video experience; it includes a second video stream conveying visual content of the shareable video experience and a second set of interface controls, the second set of interface controls being useable by video-consumer devices incapable of real-time interaction to present supplementary data in connection to the shareable video experience.

This Summary is provided to introduce a selection of concepts in a simplified form that are further described below in the Detailed Description. This Summary is not intended to identify key features or essential features of the claimed subject matter, nor is it intended to limit the scope of the claimed subject matter. The claimed subject matter is also not limited to implementations that solve any disadvantages noted in any part of this disclosure.

DETAILED DESCRIPTION

Figure 1:
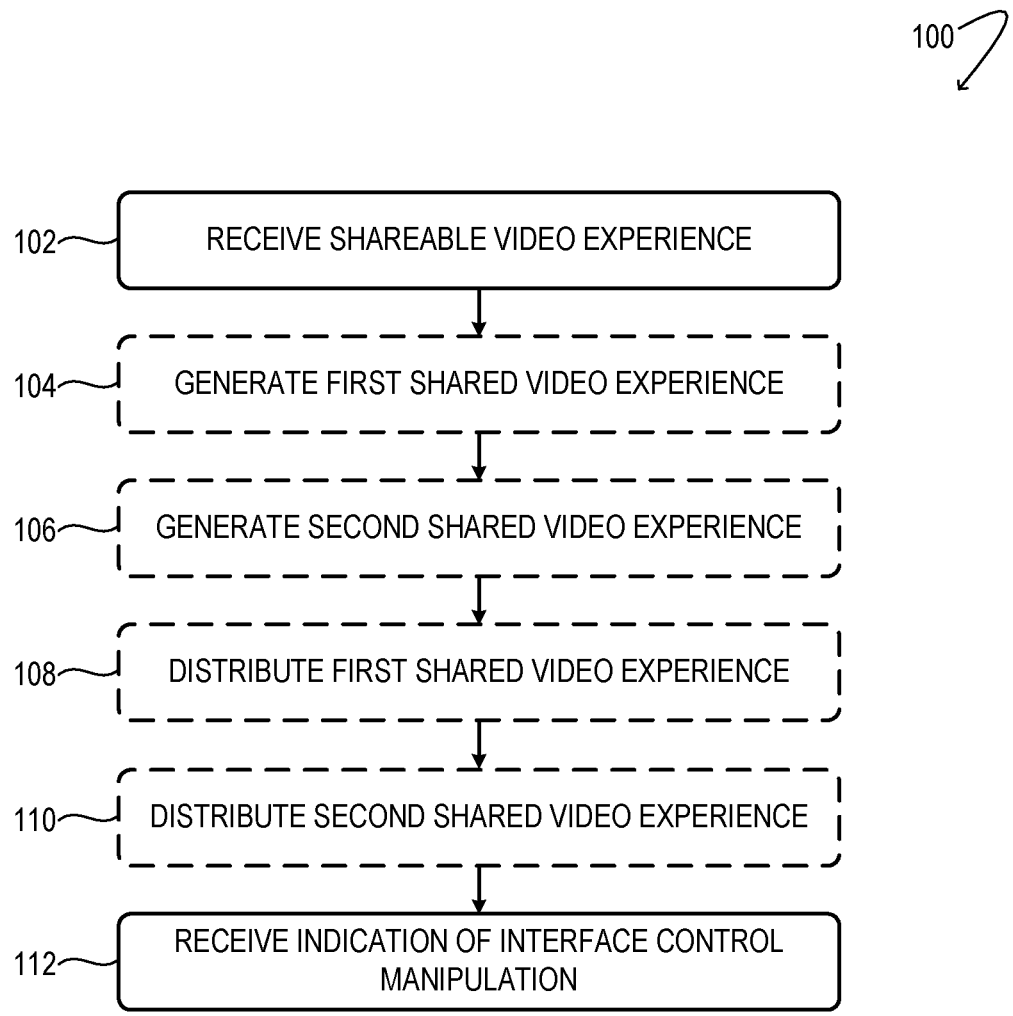
FIG. 1 illustrates an example method for distributing a shareable video experience among plural video-consumer devices.

This disclosure is presented by way of example, and with reference to the drawing figures listed above. Components, process steps, and other elements that may be substantially the same in one or more of the figures are identified coordinately and described with minimal repetition. It will be noted, however, that elements identified coordinately may also differ to some degree. It will be further noted that the figures are schematic and generally not drawn to scale. Rather, the various drawing scales, aspect ratios, and numbers of components shown in the figures may be purposely distorted to make certain features or relationships easier to see.

Audiovisual content from a shareable video experience may be broadcast or otherwise distributed to one or more video-consumer devices over a network. In one example, an individual playing a video game may choose to broadcast his or her gameplay over the Internet for viewing interested viewers equipped with suitable video-consumer devices—computers, handhelds, smartphones, virtual-reality headsets, etc. In a different example, gameplayers may interact or compete in a shared virtual space, while audiovisual content from the shared virtual space is broadcast over the Internet. The video-consumer devices that receive such broadcasts may have some ability to interact with the experience-providing devices of the gameplayers. They may provide, for example, text questions or comments via a chat interface. Additionally or alternatively, the video-consumer devices may facilitate interaction with the shareable video experience itself. For instance, a user interface presented on a video-consumer device may include one or more interface controls that can be manipulated by the user to modify the state and/or progression of the shareable video experience. Such controls may, for example, allow the user of the video-consumer device to provide a specific gameplayer with a bonus or power-up, spawn an enemy, alter the gameplayer's inventory, vote for an outcome, etc.

Some issues arise, however, when shareable video experiences that were originally broadcast live are received belatedly by one or more video-consumer devices. For example, some interface controls that allow live video-consumer device users to modify a live shareable video experience will be non-functional after the shareable video experience has concluded. Using the example above, the non-live video-consumer device user will not be able to provide a gameplayer with a bonus if the game has already finished, or the gameplayer is no longer participating. This and related issues arise, for example, whenever a video-consumer device receives a shareable video experience that has already finished, or with a significant time delay (e.g., more than a few seconds), or when the video-consumer device does not support the required interface controls, or when the user of the video-consumer device is not logged in. While users of such devices could be offered an experience that does not include interface controls, or one in which non-functional interface controls are disabled, such solutions may degrade the user experience by presenting obviously reduced functionality relative to the experience enjoyed by live participants.

Accordingly, the present disclosure is directed to distributing shareable video experiences in a manner that preserves or introduces some other level interactivity for video-consumer devices incapable of interacting in a live manner.

In one example, a broadcast service, upon receiving a data stream representing a shareable video experience, generates two or more different shared video experiences, each having a video stream conveying visual content of the shareable video experience and offering one or more interface controls. Each of the shared video experiences is intended for a different group of users. One shared video experience may be intended for video-consumer devices capable of real-time interaction with the shareable video experience. It may include interface controls that enable the video-consumer device to modify the shareable video experience. Another shared video experience may be intended for non-interaction-capable (or 'camera-only') video-consumer devices; it may include a set of interface controls that allow such devices to access supplementary data in connection to the shareable video experience. Such data may include, for example, a view of the shareable video experience from the perspective of a specified gameplayer or team, statistics related to a specified gameplayer at a current playback time, historical game data (e.g., high scores and associated gameplayers), a gameplayer inventory, a mini-map, etc. In some examples, in experiences in which live participants have the ability to cast votes for a desired player or outcome, the supplementary data provided to non-live participants may include an aggregate of such voting over any suitable time interval. In this way, the non-live participant is offered a richer, more informed experience. In sum, the approach herein allows two or more different user-device groups to be targeted based on ability to interact, as opposed to whether they happen to be viewing the shareable video experience live. This solution provides an appropriately interactive experience for both live and non-live video-consumer devices.

As used herein, a 'shared video experience' refers to one or more sets or streams of computer data that can be used to render and display a user interface on a video-consumer device. The term 'video' does not preclude sound transmission, and may include synchronized audio in some examples. A shared video experience may comprise a video stream as well as one or more interface controls. Components of a shared video experience may be packaged and transmitted to a video-consumer device together or separately. Depending on the mode of implementation, a user-interface may be achieved either by a video-consumer device or by a computer system associated with a broadcast service (see below). More generally, a shared video experience may include any combination of computer data suitable for displaying a video stream of a shareable video experience, interacting with the shareable video experience, and/or accessing data associated with the shareable video experience. It may be packaged, transmitted, and rendered in any way and by any suitable computing device. Further, while the present disclosure generally contemplates two different shared video experiences (i.e., one for video-consumer devices capable of real-time interaction with the shareable video experience and one for video-consumer devices incapable of real-time interaction), it will be understood that a broadcast service may generate any suitable number of distinct shared video experiences, each having any suitable attribute.

FIG. 1 illustrates some aspects of the process flow summarized above, which is further described hereinafter with reference to subsequent drawing figures. Method 100 of FIG. 1 is a method for distributing a shareable video experience among plural video-consumer devices.

At 102 of method 100, a data stream defining the shareable video experience is received from a provider device—e.g., a networked game system or video camera. At 104 a first shared video experience is generated based on the data stream. The intended recipients of the first shared video experience are video-consumer devices capable of real-time interaction with the shareable video experience. The first shared video experience includes a first video stream conveying visual content of the shareable video experience and offering a first set of interface controls. The first set of interface controls is useable by the video-consumer devices capable of real-time interaction to modify the shareable video experience.

At 106 a second shared video experience is generated based on the data stream received at 102. The intended recipients of the second shared video experience are video-consumer devices incapable of real-time interaction with the shareable video experience. The second shared video experience includes a second video stream conveying visual content of the shareable video experience and offers a second set of interface controls. The second set of interface controls is useable by video-consumer devices incapable of real-time interaction, to present supplementary data in connection to the shareable video experience.

At 108 the first shared video experience is distributed via a computer network to one or more video-consumer devices capable of real-time interaction with the shareable video experience. At 110 the second shared video experience is distributed via the computer network to video-consumer devices incapable of real-time interaction with the video experience. At 112 an indication from a video-consumer device that an interface control has been manipulated is received and acted upon. The consequences of receiving such an indication may vary from one implementation to the next and are described in further detail herein.

Figure 2:
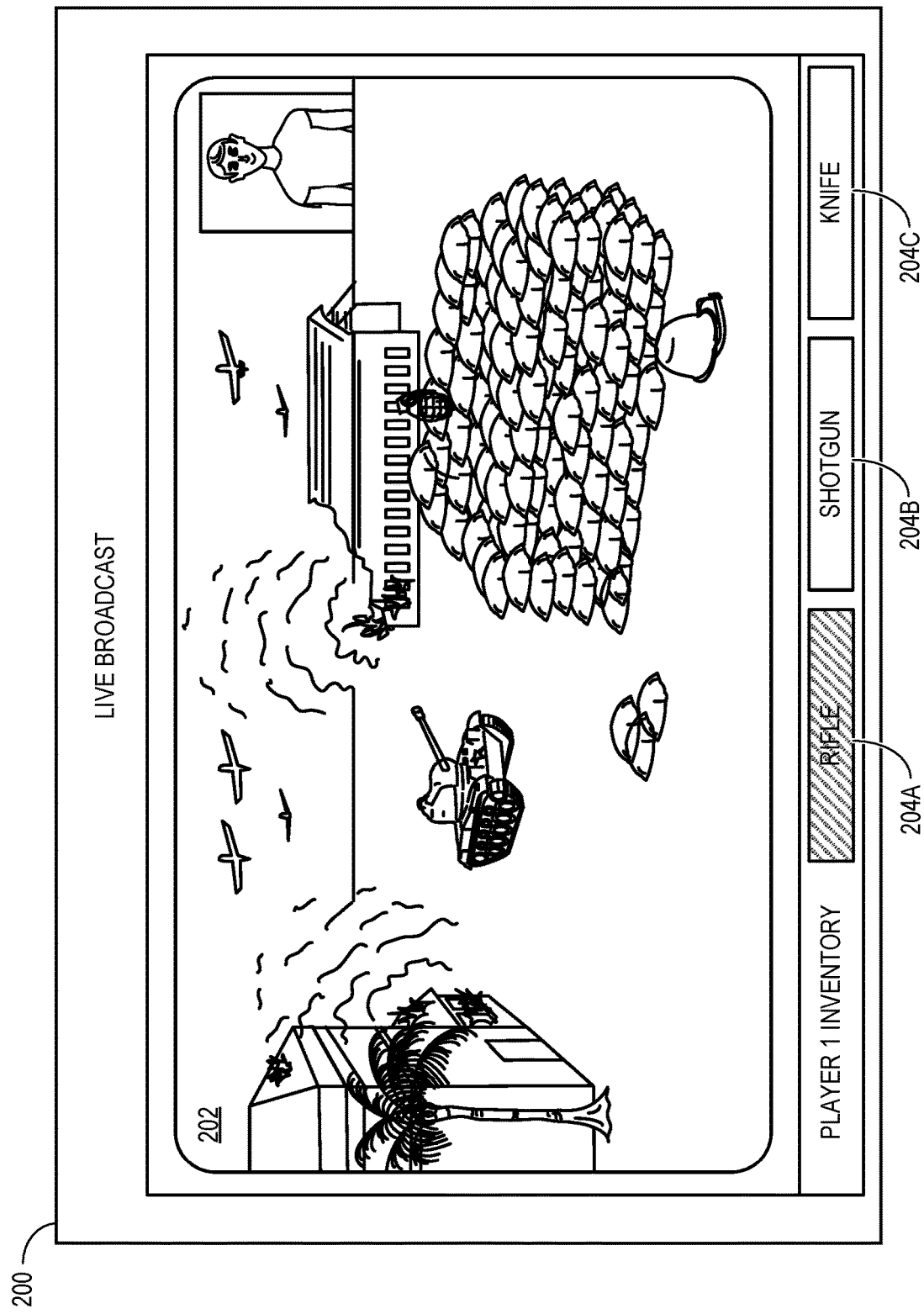
FIG. 2 shows aspects of an example shared video experience for video-consumer devices capable of real-time interaction with a shareable video experience.

FIG. 2 shows aspects of an example user interface 200 including a live video feed 202 of a shareable video experience. In some examples, user interface 200 may be rendered from a shared video experience generated by a broadcast service (see below). User interface 200 may be rendered and/or displayed by any suitable video-consumer device. For example, user interface 200 may be rendered for display on a smartphone, wearable device, tablet, laptop, desktop, server, augmented or virtual reality device, media center, etc. In some examples, user interface 200 may be rendered and/or displayed by a computer system as described below with reference to FIG. 5.

In the example of FIG. 2, the shareable video experience is a multiplayer video game. However, in other examples, the shareable video experience may include other types of broadcast. Indeed, the shareable video experience may include any interactive or participatory experience with a recorded or otherwise associated video. The shareable video experience may take place in a real and/or virtual space, in which various participants may interact. The shareable video experience may include a video transmission of a real-world experience (e.g., a baseball game or music concert), for instance. From a video-consumer device capable of real-time interaction with the shareable video experience, the interface controls could, for example, enable the device user to suggest plays, strategies, or substitutions to a gameplayer, team, orchestra, or performer, alter lighting conditions, etc.

From a video-consumer device incapable of real-time interaction with the shareable video experience, the interface controls may enable the user to view supplementary information related to the real-world experience—batting averages, earned-run averages and other statistics of the baseball players, venues in which the music performers have appeared, critical reviews they have received, etc.

In the example of FIG. 2, the shareable video experience derives from execution of video game software by one or more provider devices (see below) that render video or otherwise cause video to be rendered. By interacting with interface controls on user interface 200, the device user may modify the shareable video experience, by, for example, altering one or more properties or variables of the video game software executing on a provider device. This action may affect how the video game software is executed.

FIG. 2 shows an example first set of interface controls 204, which enable gameplay to be modified via a video-consumer device. In this example, the interface controls allow video-consumer devices linked to the shareable video experience to manage and/or modify the inventory of a gameplayer participating in the shareable video experience. Specifically, selection of interface control 204A causes the video game software providing the shareable video experience to automatically change the gameplayer's equipped item to a rifle. Similarly, selection of interface controls 204B or 204C changes the gameplayer's equipped item to a shotgun or knife, respectively. In other examples, selection of one of the interface controls 204A via the video-consumer device may not immediately change the gameplayer's equipped item. Rather, selection of one of the interface controls 204 may amount to a suggestion to the gameplayer of an item that the device user believes the gameplayer should equip with.

In other examples, the first set of interface controls 204 may enable transmission of a vote from a video-consumer device to a provider device (e.g., game system). For instance, selection of one of the interface controls 204 may constitute a vote for the item that the device user believes the gameplayer should equip with. When a particular item receives a majority of the votes cast by the various video-consumer devices linked to the experience, the gameplayer may be equipped with that item. Alternatively, the item with the most votes may be provided once an in-game condition or threshold is met (e.g., the start of a new match), or, the gameplayer may simply be provided a notification indicating which item has received the highest number of votes. It will be understood that interface controls, such as those shown in FIG. 2, may function in any suitable way. Because the specific controls shown in FIG. 2 allow video-consumer devices to modify a shareable video experience, thereby altering its state, user interface 200 may be intended for video-consumer device capable of real-time interaction with the video experience.

The user interface shown in FIG. 2, including the video broadcast of the shareable video experience and the interface controls, are presented as examples and are not limiting. In other examples, a user interface may include more, fewer, or different components and interactive elements, each having any suitable size and position. Similarly, interface controls may be manipulated and/or interacted with in any suitable way, and may be used to provide any suitable input to a shareable video experience and/or participant in the shareable video experience.

Figure 3:
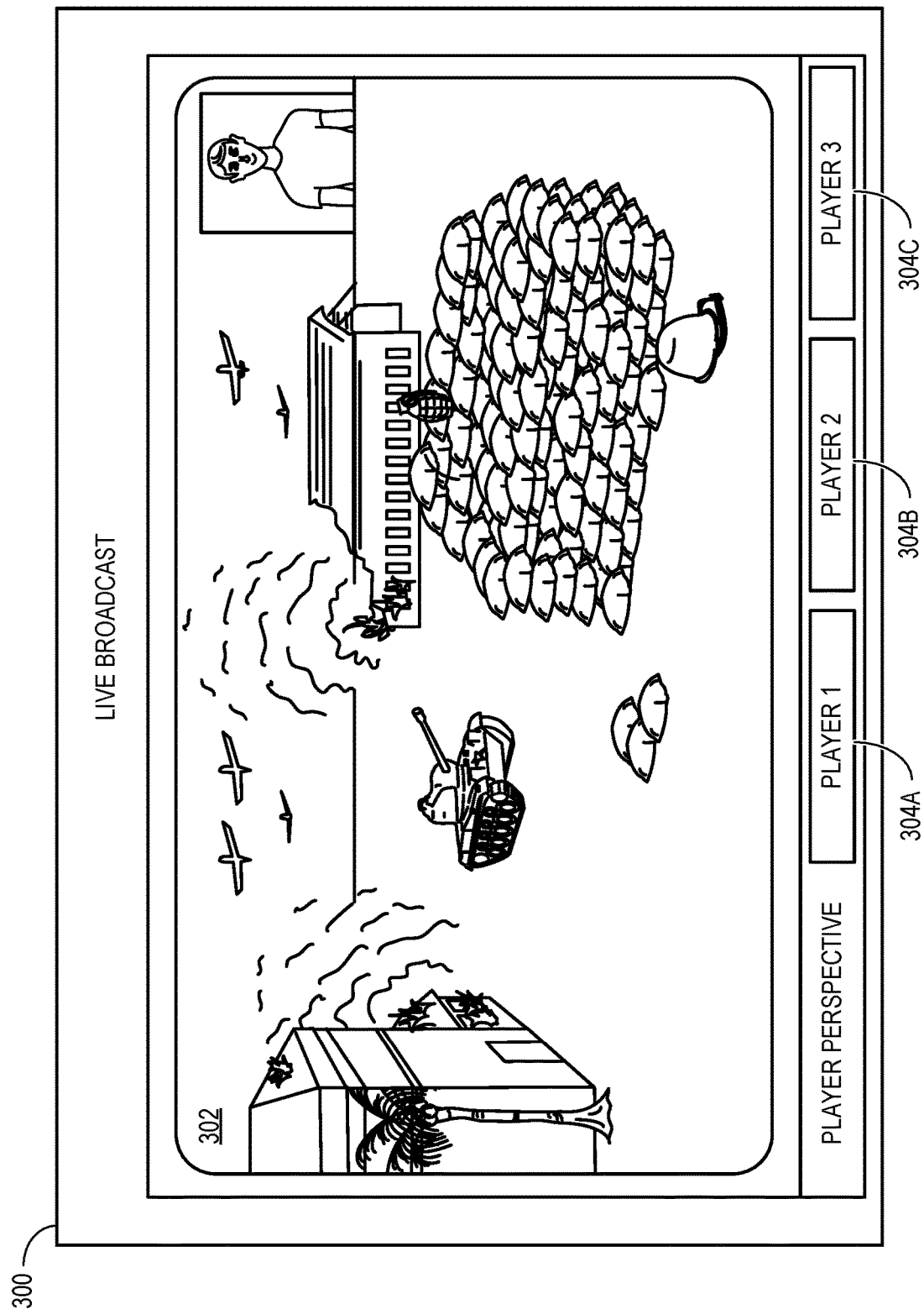
FIG. 3 shows aspects of an example shared video experience for video-consumer devices incapable of real-time interaction with a shareable video experience.

FIG. 3 depicts an example of a user interface 300 that may be rendered based on a shared video experience generated for non-interaction capable video-consumer devices. For example, user interface 300 may be rendered on receipt of the second shared video experience by a video-consumer device incapable of real-time interaction with the video experience 436.

As shown in FIG. 3, user interface 300 includes a video stream 302 of a shareable video experience and several interface controls 304. However, unlike user interface 200, user interface 300 is rendered after the shareable video experience has already finished. In some examples, video stream 302 may be rendered from stored data rather than from a live data stream. Such non-live video may in some cases represent recorded footage (e.g., a recording of the footage provided to video-consumer devices capable of real-time interaction with the video experience), or new footage rendered 'from scratch' from stored game data, potentially from a user-selectable angle or perspective. It will be understood that user interface 300 may be rendered for any number of video-consumer devices incapable of real-time interaction with the video experience, including those receiving the shareable video experience after a time delay, with a logged-out user, on an interaction-incapable device, etc.

Because user interface 300 has been rendered for video-consumer devices incapable of real-time interaction with the video experience, interface controls 304 are not useable to modify or alter the state or progression of the shareable video experience. However, they may still be used to access and review supplementary data or information provided by or associated with the shareable video experience. In the example of FIG. 3, selection of the interface controls allows the video-consumer device to change the perspective from which the shareable video experience is viewed. Specifically, the user in this example has selected interface control 304A, and is viewing the shareable video experience from the point of view of gameplayer 1. However, selection of interface control 304B or 304C changes the video-consumer device perspective, allowing the user to view the shareable video experience from the point of view of gameplayer 2 or gameplayer 3, respectively. Selection of these interface controls may cause the video-consumer device to request different data from the broadcast service—i.e., a video stream recorded from a different gameplayer's perspective, or a newly rendered video stream based on stored game data. Thus, the non-live video stream may include video reconstituted from stored data from the shareable video experience from the point of view of a chosen gameplayer. Accordingly, the non-live participant may see the game unfold as the chosen gameplayer saw the game unfold. This experience may include paths traveled through the game environment, other players, creatures, or obstacles encountered, etc. In this example, even though the shareable video experience may have already finished, the video-consumer device is still able to experience some degree of interactivity. This aspect presents advantages over other solutions, in which interaction is completely removed.

In one particular example, every action of a live participant in a shareable video experience may be stored in an application server (in key-active elastic storage, for example) and associated with a time stamp. The time stamp associated with each action may be computed relative to the start of the video experience (to immunize against lags, etc.). Some actions may be categorized in any appropriate way— e.g., help versus harm actions—from the point of view of any gameplayer or team of gameplayers. Other actions, or sequences of actions, may define the various paths that a gameplayer or other participant may travel in real time through a real or virtual environment during the shareable video experience. A path defined in this manner may be recorded from the perspective of the travelling gameplayer or participant. Moreover, the imagery seen along that path may be recorded or reconstructed based on the path (as defined by navigation actions or coordinates, each with an associated time stamp).

When the shareable video experience is received on a device incapable of real-time interaction (perhaps after a time delay), any of the various stored or reconstructable paths may be accessed by the non-live participant user of the device. Thus, even the non-live user is able to autonomously navigate the environment and experience gameplay events as they unfolded, and from different player perspectives. In some examples, the non-live user may even be able to explore previously unexplored portions of the environment, provided that such exploration does not alter aspects of the real timeline that have already unfolded. In addition, the non-live view may be presented with interface controls to access real-time voting data—time stamped and/or aggregated, for example. This information enables the non-live participant to understand, for example, how the various 'helps' and 'hurts' effected by live participants shaped the shareable video experience.

It will be understood that the specific interface controls shown in FIG. 3 are intended as examples and are not limiting. In general, a shared video experience rendered for video-consumer devices incapable of real-time interaction with a video experience may include any suitable interface controls, provided those interface controls do not require that live input be sent to the provider device or broadcast service. As examples, interface controls provided for a video-cons device incapable of real-time interaction with the video experience may allow the video-consumer device to change the perspective to focus on a specific gameplayer or team, retrieve statistics or historical data, retrieve a gameplayer's inventory at current given playback time, and/or reorient an environment map associated with the shareable video experience for display on the video-consumer device.

Figure 4:
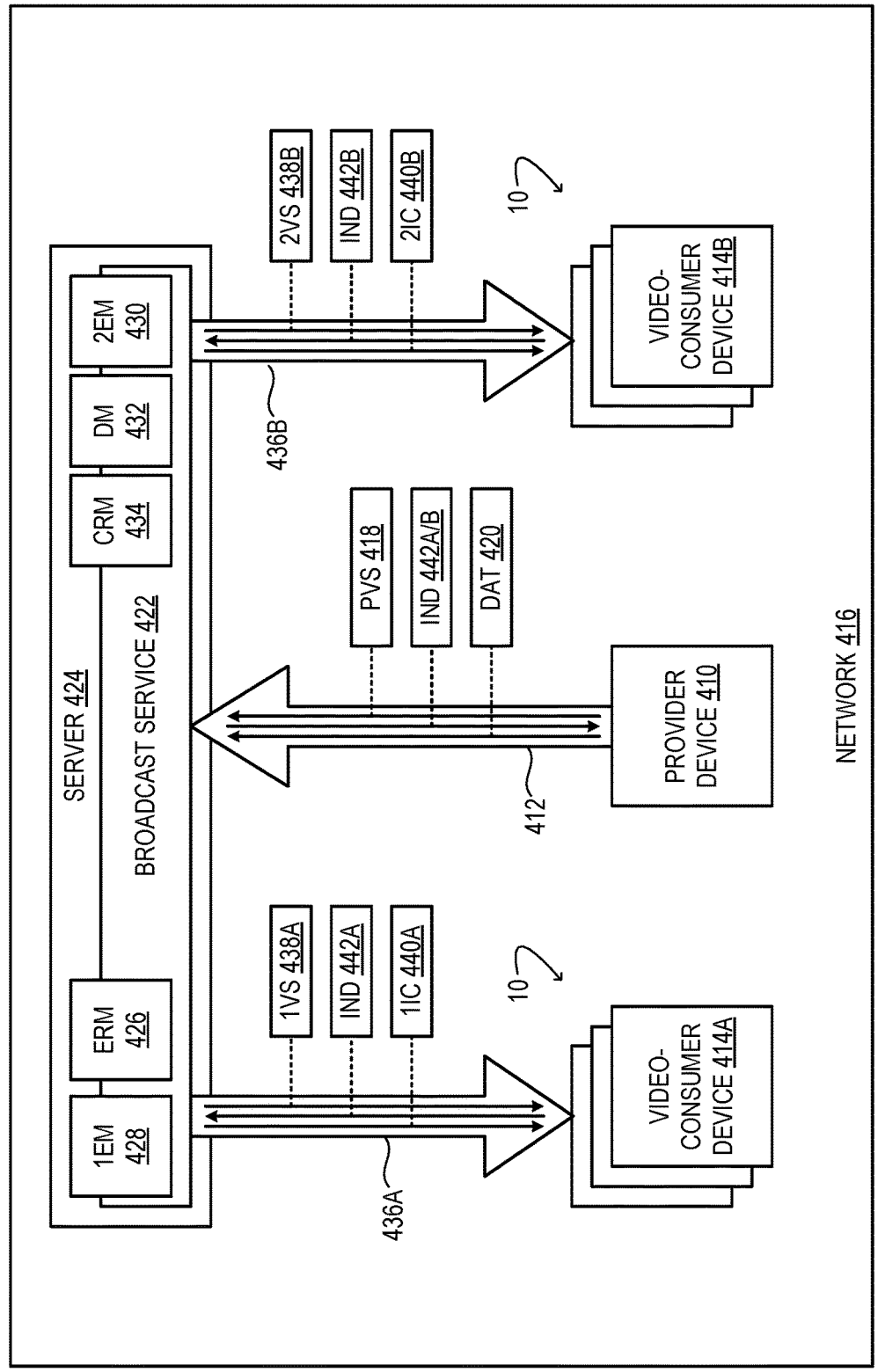
FIG. 4 shows aspects of an example environment for distributing a shareable video experience.

FIG. 4 shows aspects of an example network architecture 400 that may be used to facilitate distribution or broadcast of a shareable video experience as described herein. Specifically, FIG. 4 shows a provider device 410, which may be any suitable computing device originating the shareable video experience. For example, when the shareable video experience is a video game, then device 410 may be a personal computer or game system executing video game software and generating audiovisual content. In a different example, the provider device may be a server computer associated with an online gaming service executing video game software and thereby providing a virtual space for gameplayers to interact or compete. In other examples, the provider device may include a video camera with or without a microphone. In still other examples, the provider device may take on other suitable forms dependent on the nature of the shareable video experience.

More generally, provider device 410 may include any suitable computing device capable of providing a data stream 412 representing a shareable video experience and receiving input from one or more video-consumer devices 414 over a computer network 416. In the illustrated example, the data stream includes a provider video stream (PVS) 418. Here, the act of generating the first and second shared video experiences (104 and 106 in FIG. 1) may include augmenting the provider video stream. In some examples, the provider device may include a computer system as described below with reference to FIG. 5.

Continuing in FIG. 4, data stream 412 defines the shareable video experience. The data stream may take any suitable form depending on the nature of the shareable video experience. For example, when the shareable video experience is a video game, the data stream may comprise raw output of a video game application, which may be processed, modified, and/or rendered by a broadcast service or other computer system. In some examples, the data stream may include a representation or copy (e.g., recorded via screen capture or similar technology) of the visual content displayed to a participant in a shareable video experience. Such visual content may in some cases be supplemented by additional data (DAT) 420 provided by provider device 410 (e.g., gameplayer, game settings, or inventory information, an environment map, scoring data or statistics, etc.). The data stream may additionally or alternatively include footage of real-world places or objects. For example, the data stream may include recordings of real-world events, a live stream of a gameplayer or broadcaster's face, etc. The data stream may be encoded and transmitted in any suitable way, using any suitable compression protocol, codec, etc.

Data stream 412 is received by a broadcast service 422, which executes on server system 424. The server system includes an experience-receiver module (ERM) 426 configured to receive data stream 412 from the provider; a first experience-generator module (1EM) 428 configured to generate the first shared video experience; a second experience-generator module (2EM) 430 configured to generate the second shared video experience; a distributor module (DM) 432 configured to distribute the first and second shared video experiences via the computer network; and a control-receiver module (CRM) 434 configured to receive control input from linked video-consumer devices. The server system is communicatively coupled to provider device 410 and to the various video-consumer devices 414 via computer network 416, such that the data stream from the provider device is received via the computer network, and the first and second shared video experiences are distributed to the video-consumer devices via the computer network.

Continuing in FIG. 4, broadcast service 422 may be any service, process, application, etc., configured to take a data stream 412 representing a shareable video experience and generate a shared video experience through which the video-consumer devices can share (view and in some cases interact with) the shareable video experience. The broadcast service may be provided by a third party (e.g., a website or application server), maintained by a developer or organizer of the shareable video experience, or by a gameplayer or broadcaster participating in the shareable video experience, or by any another suitable party. In some non-limiting examples, the broadcast service may be executed by software running on the same device(s) providing and/or recording the shareable video experience. More generally, the broadcast service may be implemented on any suitable computer system, such as the computer system described below with reference to FIG. 5.

Upon receiving data stream 412, broadcast service 422 may perform one or more processing steps to generate one or more shared video experiences based on the data stream. As noted above, a shared video experience is any collection of computer data useable to render a user interface for display to a video-consumer device, and may include a video stream of a shareable video experience and one or more interface controls. The data stream received from provider device 410 may include or be useable to generate two or more such video streams, which define different variants of the shareable video experience. The video stream may then be augmented with one or more of the interface controls discussed above. In general, augmentation of a video stream with an interface control could be performed by the provider device, broadcast service, video-consumer device, etc. Each of these variants is within the scope of this disclosure. However, it may be advantageous for the broadcast service to manage the interface controls, as this frees the video-consumer devices from experience-specific software requirements, and allows the provider device to be agnostic to the specific broadcast service in use (i.e., it allows the provider device to support multiple broadcast services independently, even those that do not support interface controls).

The interface controls may be maintained by broadcast service 422 in any suitable way. In some examples, the appearance and functionality of the interface controls may be represented as computer data according to any suitable programming, scripting, or design language or protocol. For example, the interface controls may be built or specified using Hypertext Markup Language (HTTP), Cascading Style Sheets (CSS), JavaScript Object Notation (JSON), etc. The interface controls may be provided to the broadcast service by any suitable party, for instance by a developer (e.g., of a video game application), an organizer of a shareable video experience, etc. The interface controls may be transmitted to the broadcast service at any suitable time, for instance when a video game is released or a shareable video experience is scheduled or has begun. Alternatively, when a shareable video experience is provided by a software application (e.g., a video game), the interface controls may be developed in tandem with the software application, for instance on a developer computing device or on a platform provided by the broadcast service.

In FIG. 4, broadcast service 422 generates two different shared video experiences based on data stream 412. Specifically, a first shared video experience 436A includes a first video stream (1VS) 438A and a first set of interface controls (1IC) 440A. Similarly, a second shared video experience 436B includes a second video stream (2VS) 438B and a second set of interface controls (2IC) 440B. Each of the shared video experiences are then transmitted to the appropriate set of video-consumer devices 414. In FIG. 4, the first shared video experience is transmitted to a first set of video-consumer devices 414A, while the second shared video experience is transmitted to a second set of video-consumer devices 414B. Naturally, each set of video-consumer devices may include any suitable number of video-consumer devices, ranging from a single video-consumer device to many millions of video-consumer devices. In some examples, the shared video experiences may be received for rendering and/or display by video-consumer device devices owned or used by individual users. It will be understood that a 'video-consumer device' as used herein may take any suitable form. For example, a video-consumer device may be a smartphone, wearable device, tablet, laptop, desktop, augmented/virtual reality device, media center, etc. In some cases, a video-consumer device may include a computer system as described below with reference to FIG. 5.

As discussed above, an interface control may allow a video-consumer device linked to a shareable video experience to modify or interact with the shareable video experience in some way, or, to retrieve supplementary information associated with or generated by the shareable video experience. Accordingly, broadcast service 422 may be configured to receive, from one or more video-consumer devices 414, an indication (IND) 442 that a video-consumer device has manipulated an interface control. The indication may take the form of a data stream. Based on the nature of the manipulation, the broadcast service may respond to the input, either by accessing and providing requested supplementary information (responsive to IND 442B) or by sending an input or command to provider device 410 (responsive to IND 442A).

The video stream and interface controls may be transmitted by the broadcast service in any suitable way. In some cases, the video stream and interface controls may be sent as separate data streams and combined into a single shared video experience by the video-consumer device receiving the experience. The video-consumer device may then render the shared video experience via a user interface thereof. In such cases, one or both of the video stream and the interface controls may include or be sent alongside formatting data specifying the size and placement of the video stream and the controls within the user interface. Alternatively, the video stream and interface controls may be transmitted to the video-consumer devices together as a single data stream. The size and placement of user interface elements may in some cases be specified by the developer or organizer of the shareable video experience and/or the gameplayer or broadcaster that initiated the shareable video experience broadcast.

Upon receiving the video stream and interface controls from the broadcast service, a video-consumer device 414 may then display the video stream and interface controls as components of a user interface. As discussed above, FIG. 2 shows an example user interface 200 including a video stream of a live shareable video experience as well as multiple interface controls. User interface 200 may, for example, be rendered by a video-consumer device after receiving first shared video experience 436A. When a video-consumer device interacts with one of the event controls, data representing the interaction may be transmitted by the video-consumer device to the broadcast service, and provided as input to the provider device.

As noted hereinabove, broadcast service 422 may generate different shared video experiences for different groups of video-consumer devices, and the differences between the shared video experiences may depend on the differences between the groups of video-consumer devices. In one example, a first group of video-consumer devices may be viewing the shareable video experience substantially 'live' (i.e., with little to no time delay between events actually unfolding in the shareable video experience and a representation of those events as shown in the video stream). This group is fully capable of interacting with the shareable video experience. Accordingly, at least one of the video-consumer devices capable of real-time interaction may be a live consumer of the shareable video experience, and here the first video stream may be a live video stream. Moreover, the first set of interface controls may be configured to, when manipulated, modify the shareable video experience by sending input to the provider device and/or broadcast service. In contrast, a second group of video-consumer devices may receive the shareable video experience after it has finished, or after a substantial time delay. Accordingly, at least one of the video-consumer devices incapable of real-time interaction may be a non-live consumer of the shareable video experience, and here the second video stream may be a non-live video stream. Moreover, the second set of interface controls may be configured to, when manipulated, access and display supplementary information associated with the shareable video experience, rather than modify the state of the shareable video experience. In other cases, the second shared video experience may include a live video stream, though still lack interface controls capable of modifying the shareable video experience. This may be done, for example, when the second group of video-consumer devices do not support interaction with the experience, or when the users of those devices are logged out.

In some examples, it may be beneficial to distinguish groups of users based on ability to interact as opposed to live versus non-live status. In an example scenario, a broadcast service may generate any number of different shared video experiences for video-consumer devices capable of real-time interaction with a shareable video experience (examples tailored to specific gameplayers or teams that the device users support), while also generating a single 'catch-all' shared video experience for all video-consumer devices incapable of real-time interaction with the video experience, including non-live video-consumer devices. From a development standpoint, this can alleviate the need to use complicated conditional statements to tailor shared video experiences to both live and non-live video-consumer devices.

In some cases, the different shared video experiences may be stored by the broadcast service and transmitted at different times. For example, one shared video experience may be transmitted concurrently to all video-consumer devices capable of real-time interaction with the interactive video experience, while a second shared video experience is stored and transmitted on request to any video-consumer device incapable of real-time interaction with the shareable video experience. In some cases, these shared video experiences be created at the same (e.g., at the start of the shareable video experience), or at different times. In an example scenario, one shared video experience to be provided to live video-consumer devices may be recorded and, upon request by one or more non-live video-consumer devices, converted into a second shared video experience having different interface controls. Thus, the non-live video stream may include a recording of a live video stream provided in the first video stream. In other examples, upon the start of the shareable video experience, the broadcast service may automatically generate and store all desired shared video experiences for transmission to video-consumer devices as needed.

In some examples, the methods and processes described herein may be tied to a computer system of one or more computing devices. In particular, such methods and processes may be implemented as a computer-application program or service, an application-programming interface (API), a library, and/or other computer-program product.

Figure 5:
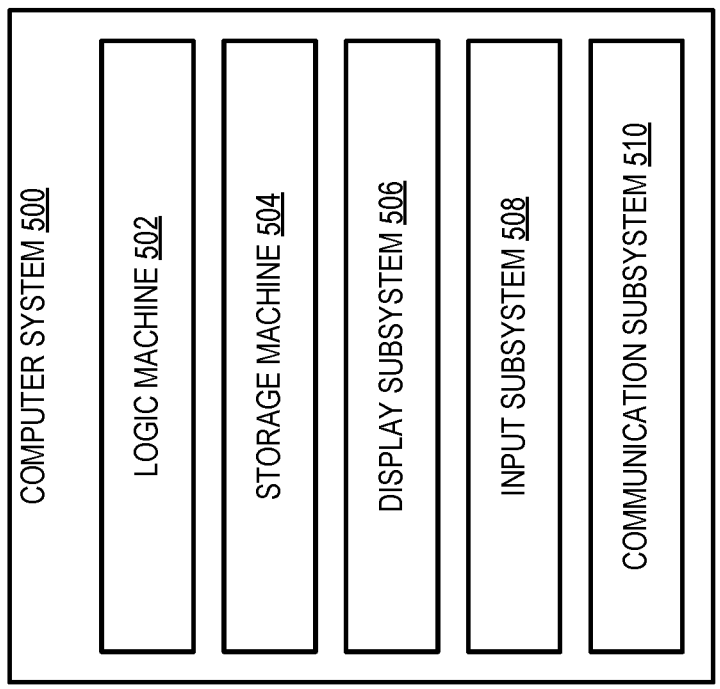
FIG. 5 shows aspects of an example computer system as described herein.

FIG. 5 schematically shows a non-limiting embodiment of a computer system 500 that can enact one or more of the methods and processes described above. Computer system 500 is shown in simplified form. Computer system 500 may take the form of one or more personal computers, server computers, tablet computers, home-entertainment computers, network computing devices, gaming devices, mobile computing devices, mobile communication devices (e.g., smart phone), and/or other computing devices.

Computer system 500 includes a logic machine 502 and a storage machine 504. Computer system 500 may optionally include a display subsystem 506, input subsystem 508, communication subsystem 510, and/or other components not shown in FIG. 5.

Logic machine 502 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 504 includes one or more physical devices configured to hold instructions executable by the logic machine to implement the methods and processes described herein. When such methods and processes are implemented, the state of storage machine 504 may be transformed—e.g., to hold different data.

Storage machine 504 may include removable and/or built-in devices. Storage machine 504 may include optical memory (e.g., CD, DVD, HD-DVD, Blu-Ray Disc, etc.), semiconductor memory (e.g., RAM, EPROM, EPROM, etc.), and/or magnetic memory (e.g., hard-disk drive, floppy-disk drive, tape drive, MRAM, etc.), among others. Storage machine 504 may include volatile, nonvolatile, dynamic, static, read/write, read-only, random-access, sequential-access, location-addressable, file-addressable, and/or content-addressable devices.

It will be appreciated that storage machine 504 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 502 and storage machine 504 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms 'module,' 'program,' and 'engine' may be used to describe an aspect of computer system 500 implemented to perform a particular function. In some cases, a module, program, or engine may be instantiated via logic machine 502 executing instructions held by storage machine 504. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms 'module,' 'program,' and 'engine' may encompass individual or groups of executable files, data files, libraries, drivers, scripts, database records, etc.

It will be appreciated that a 'service', as used herein, is an application program executable across multiple user sessions. A service may be available to one or more system components, programs, and/or other services. In some implementations, a service may run on one or more server-computing devices.

When included, display subsystem 506 may be used to present a visual representation of data held by storage machine 504. This visual representation may take the form of a graphical user interface (GUI). As the herein described methods and processes change the data held by the storage machine, and thus transform the state of the storage machine, the state of display subsystem 506 may likewise be transformed to visually represent changes in the underlying data. Display subsystem 506 may include one or more display devices utilizing virtually any type of technology. Such display devices may be combined with logic machine 502 and/or storage machine 504 in a shared enclosure, or such display devices may be peripheral display devices.

When included, input subsystem 508 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 510 may be configured to communicatively couple computer system 500 with one or more other computing devices. Communication subsystem 510 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computer system 500 to send and/or receive messages to and/or from other devices via a network such as the Internet.

One aspect of this disclosure is directed to a method for distributing a shareable video experience among plural video-consumer devices. The method comprises: receiving from a provider device a data stream defining the shareable video experience; generating a first shared video experience based on the data stream for video-consumer devices capable of real-time interaction with the shareable video experience, the first shared video experience including a first video stream conveying visual content of the shareable video experience and a first set of interface controls, the first set of interface controls being useable by the video-consumer devices capable of real-time interaction to modify the shareable video experience; and generating a second shared video experience based on the data stream for video-consumer devices incapable of real-time interaction with the shareable video experience, the second shared video experience including a second video stream conveying visual content of the shareable video experience and a second set of interface controls, the second set of interface controls being useable by the video-consumer devices incapable of real-time interaction to present supplementary data in connection to the shareable video experience.

In some implementations, said receiving and said generating are enacted by a video broadcast service communicatively coupled to the provider device and to the plural video-consumer devices via a computer network. In some implementations, the shareable video experience is a multiplayer video game. In some implementations, the shareable video experience includes a video transmission of a real-world experience. In some implementations, the first set of interface controls enable a gameplayer inventory to be modified via a video-consumer device. In some implementations, the first set of interface controls enable transmission of a vote from a video-consumer device to the provider device. In some implementations, the data stream includes a provider video stream, and said generating includes augmenting the provider video stream. In some implementations, further comprising receiving an indication from a video-consumer device that an interface control has been manipulated. In some implementations, at least one of the video-consumer devices capable of real-time interaction is a live consumer of the shareable video experience, and the first video stream is a live video stream. In some implementations, at least one of the video-consumer devices incapable of real-time interaction is a non-live consumer of the shareable video experience, and the second video stream is a non-live video stream. In some implementations, the non-live video stream includes a recording of a live video stream provided in the first video stream. In some implementations, the non-live video stream includes video reconstituted from stored data from the shareable video experience. In some implementations, the second set of interface controls is usable to retrieve statistics and/or historical data associated with the shareable video experience. In some implementations, the second set of interface controls is usable to retrieve a gameplayer inventory associated with the shareable video experience. In some implementations, the second set of interface controls is usable to reorient an environment map associated with the shareable video experience.

Another aspect of this disclosure is directed to a server system for distributing a shareable video experience among plural video-consumer devices, the system comprising: an experience-receiver module configured to receive from a provider device a data stream defining the shareable video experience; a first experience-generator module configured to generate a first shared video experience based on the data stream for video-consumer devices capable of real-time interaction with the shareable video experience, the first shared video experience including a first video stream conveying visual content of the shareable video experience and a first set of interface controls, the first set of interface controls being useable by the video-consumer devices capable of real-time interaction to modify the shareable video experience; a second experience-generator module configured to generate a second shared video experience based on the data stream for video-consumer devices incapable of real-time interaction with the shareable video experience, the second shared video experience including a second video stream conveying visual content of the shareable video experience and a second set of interface controls, the second set of interface controls being useable by the video-consumer devices incapable of real-time interaction to present supplementary data in connection to the shareable video experience; and a distributor module configured to distribute the first and second shared video experiences via a computer network.

In one implementation, the data stream from the provider device is received via the computer network, and the first and second shared video experiences are distributed to video-consumer devices via the computer network.

Another aspect of this disclosure is directed to a method for distributing a multiplayer video-game experience among plural video-consumer devices on a computer network. The method comprises: receiving from a provider device a data stream representing the video-game experience; generating a first shared video experience based on the data stream for video-consumer devices capable of real-time interaction with the video-game experience, the first shared video experience including a first video stream conveying the video-game experience and a first set of interface controls, the first set of interface controls being useable by the video-consumer devices capable of real-time interaction to modify the video-game experience; and generating a second shared video experience based on the data stream for video-consumer devices incapable of real-time interaction with the video-game experience, the second shared video experience including a second video stream conveying the video-game experience and a second set of interface controls, the second set of interface controls being useable by the video-consumer devices incapable of real-time interaction to present supplementary data in connection to the video-game experience.

In one implementation, the first set of interface controls enable gameplay to be modified via a video-consumer device. In one implementation, the second set of interface controls is usable to retrieve statistics and/or historical data associated with the video-game experience, to retrieve gameplayer inventory associated with the video-game experience, and/or reorient an environment map associated with the video-game experience.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for distributing a shareable video experience among plural video-consumer devices, the method comprising:
   receiving from a provider device a data stream defining the shareable video experience;
   generating first and second shared video interfaces based on the data stream, the first and second shared video interfaces including respective first and second video streams conveying visual content of the shareable video experience;
   distributing the first shared video interface to video-consumer devices capable of real-time interaction with the shareable video experience, the first shared video interface including a first set of interface controls separate from the first video stream within the first shared video interface, the first set of interface controls being useable by the video-consumer devices capable of real-time interaction to interact with, and influence, the shareable video experience; and
   distributing the second shared video interface to video-consumer devices incapable of real-time interaction with the shareable video experience, the second shared video experience including a second set of interface controls separate from the second video stream within the second shared video interface, the second set of interface controls being useable by the video-consumer devices incapable of real-time interaction to view and interact with supplementary data in connection to the shareable video experience, wherein the supplementary data includes time-sensitive data corresponding to a current playback time of the second video stream.

2. The method of claim 1 wherein said receiving and said generating are enacted by a video broadcast service communicatively coupled to the provider device and to the plural video-consumer devices via a computer network.

3. The method of claim 1 wherein the shareable video experience is a multiplayer video game.

4. The method of claim 1 wherein the shareable video experience includes a video transmission of a real-world experience.

5. The method of claim 1 wherein the first set of interface controls enable a gameplayer inventory to be modified via a video-consumer device.

6. The method of claim 1 wherein the first set of interface controls enable transmission of a vote from a video-consumer device to the provider device.

7. The method of claim 1 wherein the data stream includes a provider video stream, and wherein said generating includes augmenting the provider video stream.

8. The method of claim 1 further comprising receiving an indication from a video-consumer device that an interface control has been manipulated.

9. The method of claim 1 wherein at least one of the video-consumer devices capable of real-time interaction is a live consumer of the shareable video experience, and wherein the first video stream is a live video stream.

10. The method of claim 1 wherein at least one of the video-consumer devices incapable of real-time interaction is a non-live consumer of the shareable video experience, and wherein the second video stream is a non-live video stream.

11. The method of claim 10 wherein the non-live video stream includes a recording of a live video stream provided in the first video stream.

12. The method of claim 10 wherein the non-live video stream includes video reconstituted from stored data from the shareable video experience.

13. The method of claim 1 wherein the second set of interface controls is usable to retrieve statistics and/or historical data associated with the shareable video experience.

14. The method of claim 1 wherein the second set of interface controls is usable to retrieve a gameplayer inventory associated with the shareable video experience.

15. The method of claim 1 wherein the second set of interface controls is usable to reorient an environment map associated with the shareable video experience.

16. A server system for distributing a shareable video experience among plural video-consumer devices, the system comprising:
   an experience-receiver module configured to receive from a provider device a data stream defining the shareable video experience;
   an experience-generator module configured to generate first and second shared video interfaces based on the data stream, the first and second shared video interfaces including respective first and second video streams conveying visual content of the shareable video experience;
   a distributor module configured to distribute, via a computer network, the first shared video interface to video-consumer devices capable of real-time interaction with the shareable video experience, the first shared video interface including a first set of interface controls separate from the first video stream within the first shared video interface, the first set of interface controls being useable by the video-consumer devices capable of real-time interaction to interact with, and influence, the shareable video experience; and the distributor module configured to distribute, via the computer network, the second shared video interface to video-consumer devices incapable of real-time interaction with the shareable video experience, the second shared video interface including a second set of interface controls separate from the second video stream within the second shared video interface, the second set of interface controls being useable by the video-consumer devices incapable of real-time interaction to view and interact with supplementary data in connection to the shareable video experience, wherein the supplementary data includes time-sensitive data corresponding to a current playback time of the second video stream.

17. A method for distributing a multiplayer video-game experience among plural video-consumer devices on a computer network, the method comprising:

receiving from a provider device a data stream representing the video-game experience;

generating first and second shared video interfaces based on the data stream, the first and second shared video interfaces including respective first and second video streams conveying visual content of the video-game experience;

distributing the first shared video interface to video-consumer devices capable of real-time interaction with the video-game experience, the first shared video interface including a first set of interface controls separate from the first video stream within the first shared video experience, the first set of interface controls being useable by the video-consumer devices capable of real-time interaction to interact with, and influence, the video-game experience; and distributing the second shared video interface to video-consumer devices incapable of real-time interaction with the video-game experience, the second shared video experience including a second set of interface controls separate from the second video stream within the second shared video interface, the second set of interface controls being useable by the video-consumer devices incapable of real-time interaction to view and interact with supplementary data in connection to the video-game experience, wherein the supplementary data includes time-sensitive data corresponding to a current playback time of the second video stream.

18. The method of claim 17 wherein the first set of interface controls enable gameplay to be modified via a video-consumer device.

19. The method of claim 17 wherein the second set of interface controls is usable to retrieve statistics and/or historical data associated with the video-game experience, to retrieve gameplayer inventory associated with the video-game experience, and/or reorient an environment map associated with the video-game experience.

* * * * *